US011891902B2

(12) United States Patent
Remy

(10) Patent No.: US 11,891,902 B2
(45) Date of Patent: Feb. 6, 2024

(54) FLUID MEASUREMENT SYSTEM AND METHOD FOR OPERATING SAME

(71) Applicant: Pratt & Whitney Canada Corp., Longueuil (CA)

(72) Inventor: Patrice Remy, St-Hubert (CA)

(73) Assignee: Pratt & Whitney Canada Corp., Longueuil (CA)

( * ) Notice: Subject to any disclaimer, the term of this patent is extended or adjusted under 35 U.S.C. 154(b) by 106 days.

(21) Appl. No.: 17/721,729

(22) Filed: Apr. 15, 2022

(65) Prior Publication Data

US 2023/0332511 A1 Oct. 19, 2023

(51) Int. Cl.
*F01D 21/00* (2006.01)
*F01D 25/02* (2006.01)

(52) U.S. Cl.
CPC ........... *F01D 21/003* (2013.01); *F01D 25/02* (2013.01); *F05D 2260/56* (2013.01); *F05D 2270/301* (2013.01); *F05D 2270/80* (2013.01)

(58) Field of Classification Search
CPC .. F01D 21/003; F01D 25/02; F05D 2260/056; F05D 2270/80; F05D 2270/301
See application file for complete search history.

(56) References Cited

U.S. PATENT DOCUMENTS 3,236,093 A 2/1966 Werner
4,605,315 A * 8/1986 Kokoszka ............. F01D 21/003 374/138
4,765,751 A * 8/1988 Pannone ................ G01K 13/02 374/135
5,752,674 A 5/1998 Mears
10,465,553 B2 11/2019 Manzano
10,598,041 B2 * 3/2020 Rice ........................ F01D 17/08
10,704,413 B2 * 7/2020 Warren ................... G01P 5/165
2018/0372559 A1 12/2018 Parsons
2020/0103313 A1 4/2020 Kyritsis

OTHER PUBLICATIONS

EP search report for EP23168336.8 dated Jul. 19, 2023.

* cited by examiner

*Primary Examiner* — Courtney D Heinle
*Assistant Examiner* — Danielle M. Christensen
(74) *Attorney, Agent, or Firm* — Getz Balich LLC

(57) ABSTRACT

A measurement system for an aircraft gas turbine engine includes an instrumentation hub disposed about a rotational axis. The instrumentation hub includes at least one probe. The measurement system further includes a shield hub disposed about the rotational axis and positioned axially adjacent the instrumentation hub. The shield hub includes at least one shield configured to be radially aligned with the at least one probe of the instrumentation hub. The shield hub is rotatable about the rotational axis independent of the instrumentation hub. The at least one shield is axially translatable between a first axial position and a second axial position. The at least one shield in the first axial position is axially aligned with the at least one probe. The at least one shield in the second axial position is axially separated from the at least one probe.

20 Claims, 12 Drawing Sheets

FLUID MEASUREMENT SYSTEM AND METHOD FOR OPERATING SAME

TECHNICAL FIELD

This disclosure relates generally to instrumentation systems for aircraft gas turbine engines and more particularly to fluid measurement systems resistant to icing and fluid ingestion.

BACKGROUND OF THE ART

In various conditions, such as during testing and development, aircraft gas turbine engines may require measurement of operational parameters such as pressures and temperatures of fluids within engine flow paths (e.g., a core flow path, a bypass flow path, etc.). Accordingly, sensor instrumentation such as pressure and temperature "rakes" may be installed within the fluid flow paths to measure the desired fluid parameters. Icing tests may be performed which subject the gas turbine engine to ice, water, sleet, and other materials. To prevent icing and/or fluid ingestion of sensor instrumentation, fixed physical shielding has been used to protect the instrumentation during icing tests. However, this shielding requires operators to enter testing facilities during the performance of an icing test to manually remove the shielding so that the sensor instrumentation can be used to measure gas turbine engine parameters during operation. This shield removal process can be time consuming. Moreover, if too much time elapses before the sensor instrumentation can be used to measure operational parameters of the gas turbine engine, sufficient quantities of ice applied during the icing test may have melted, thereby requiring reperformance of the test. Accordingly, there is a need for improved measurement systems.

SUMMARY

It should be understood that any or all of the features or embodiments described herein can be used or combined in any combination with each and every other feature or embodiment described herein unless expressly noted otherwise.

According to an aspect of the present disclosure, a measurement system for an aircraft gas turbine engine includes an instrumentation hub disposed about a rotational axis. The instrumentation hub includes at least one probe. The measurement system further includes a shield hub disposed about the rotational axis and positioned axially adjacent the instrumentation hub. The shield hub includes at least one shield configured to be radially aligned with the at least one probe of the instrumentation hub. The shield hub is rotatable about the rotational axis independent of the instrumentation hub. The at least one shield is axially translatable between a first axial position and a second axial position. The at least one shield in the first axial position is axially aligned with the at least one probe. The at least one shield in the second axial position is axially separated from the at least one probe.

In any of the aspects or embodiments described above and herein, the at least one probe may include a probe body and at least one sensor inlet port extending through the probe body. The at least one sensor inlet port may be configured to receive and convey a fluid for measurement.

In any of the aspects or embodiments described above and herein, the shield hub may be configured to rotate relative to the instrumentation hub about the rotational axis. In a first rotational position of the shield hub, the at least one shield may be circumferentially aligned with the at least one probe. In a second rotational position of the shield hub, the at least one shield may be circumferentially offset from the at least one probe.

In any of the aspects or embodiments described above and herein, the at least one shield may have an arcuate cross-sectional shape.

In any of the aspects or embodiments described above and herein, the measurement system may further include a motor connected to the shield hub by a shaft. The motor may be configured to rotate the shield hub about the rotational axis.

In any of the aspects or embodiments described above and herein, shield hub may be configured such that rotation of the shield hub about the rotational axis effects axial translation of the at least one shield from the first axial position to the second axial position.

In any of the aspects or embodiments described above and herein, the measurement system may further include a fixed cam hub disposed about the rotational axis and positioned axially adjacent the shield hub. The fixed cam hub may include at least one cam positioned at an outer radial side of the fixed cam hub.

In any of the aspects or embodiments described above and herein, the shield hub may include at least one shield biasing assembly configured to engage the at least one cam.

In any of the aspects or embodiments described above and herein, the at least one shield biasing assembly may include a shield arm mounted to the shield hub and the at least one shield. The at least one shield arm may be axially translatable relative to the at least one probe between the first axial position and the second axial position.

In any of the aspects or embodiments described above and herein, the shield arm may include a shield arm follower including at least one ramped circumferential end.

In any of the aspects or embodiments described above and herein, the at least one shield biasing assembly may include a slider rod extending through the shield arm. The shield arm may be axially translatable along the slider rod. The at least one shield biasing assembly may further include a biasing spring disposed about the slider rod. The biasing spring may be positioned between the shield hub and the shield arm.

In any of the aspects or embodiments described above and herein, the at least one shield biasing assembly may include a first roller and a second roller. The first roller and the second roller may be rotatably mounted to the shield hub. The shield arm may be configured to translate between the first axial position and the second axial position between and in contact with the first roller and the second roller.

In any of the aspects or embodiments described above and herein, the at least one cam may be circumferentially offset from the at least one probe with respect to the rotational axis.

According to another aspect of the present disclosure, a gas turbine engine for an aircraft includes an annular fluid flow path disposed about a longitudinal centerline of the gas turbine engine and a measurement system. The measurement system includes an instrumentation hub disposed about a rotational axis. The instrumentation hub includes at least one probe positioned within the annular fluid flow path. The measurement system further includes a shield hub disposed about the longitudinal centerline and positioned axially adjacent the instrumentation hub. The shield hub includes at least one shield configured to be radially aligned with the at least one probe of the instrumentation hub. The shield hub is rotatable about the longitudinal centerline independent of the instrumentation hub. The at least one shield is axially translatable between a first axial position and a second axial position. The at least one shield in the first axial position is axially aligned with the at least one probe. The at least one shield in the second axial position is axially separated from the at least one probe.

In any of the aspects or embodiments described above and herein, the gas turbine engine may further include a compressor. The compressor may include the annular fluid flow path.

In any of the aspects or embodiments described above and herein, the gas turbine engine may further include a plurality of variable vanes positioned upstream of the shield hub within the annular fluid flow path.

In any of the aspects or embodiments described above and herein, the gas turbine engine may be configured to rotate relative to the instrumentation hub about the longitudinal centerline. In a first rotational position of the shield hub, the at least one shield may be circumferentially aligned with the at least one probe. In a second rotational position of the shield hub, the at least one shield may be circumferentially offset from the at least one probe.

According to another aspect of the present disclosure, a method for operating a measurement system for an aircraft gas turbine engine includes rotating a shield hub including at least one shield relative to an instrumentation hub including at least one probe in a first rotational direction to circumferentially offset the at least one shield from the at least one probe. The method further includes axially translating the at least one shield relative to the at least one probe to axially offset the at least one shield from the at least one probe, as the shield is rotated in the first rotational direction.

In any of the aspects or embodiments described above and herein, the method may further include performing an icing test with the at least one shield circumferentially aligned with the at least one probe, prior to the steps of rotating the shield hub and axially translating the at least one shield.

In any of the aspects or embodiments described above and herein, the method may further include measuring a fluid flow parameter of a fluid with the at least one probe, subsequent to the steps of rotating the shield hub and axially translating the at least one shield.

The present disclosure, and all its aspects, embodiments and advantages associated therewith will become more readily apparent in view of the detailed description provided below, including the accompanying drawings.

DETAILED DESCRIPTION

Figure 1:
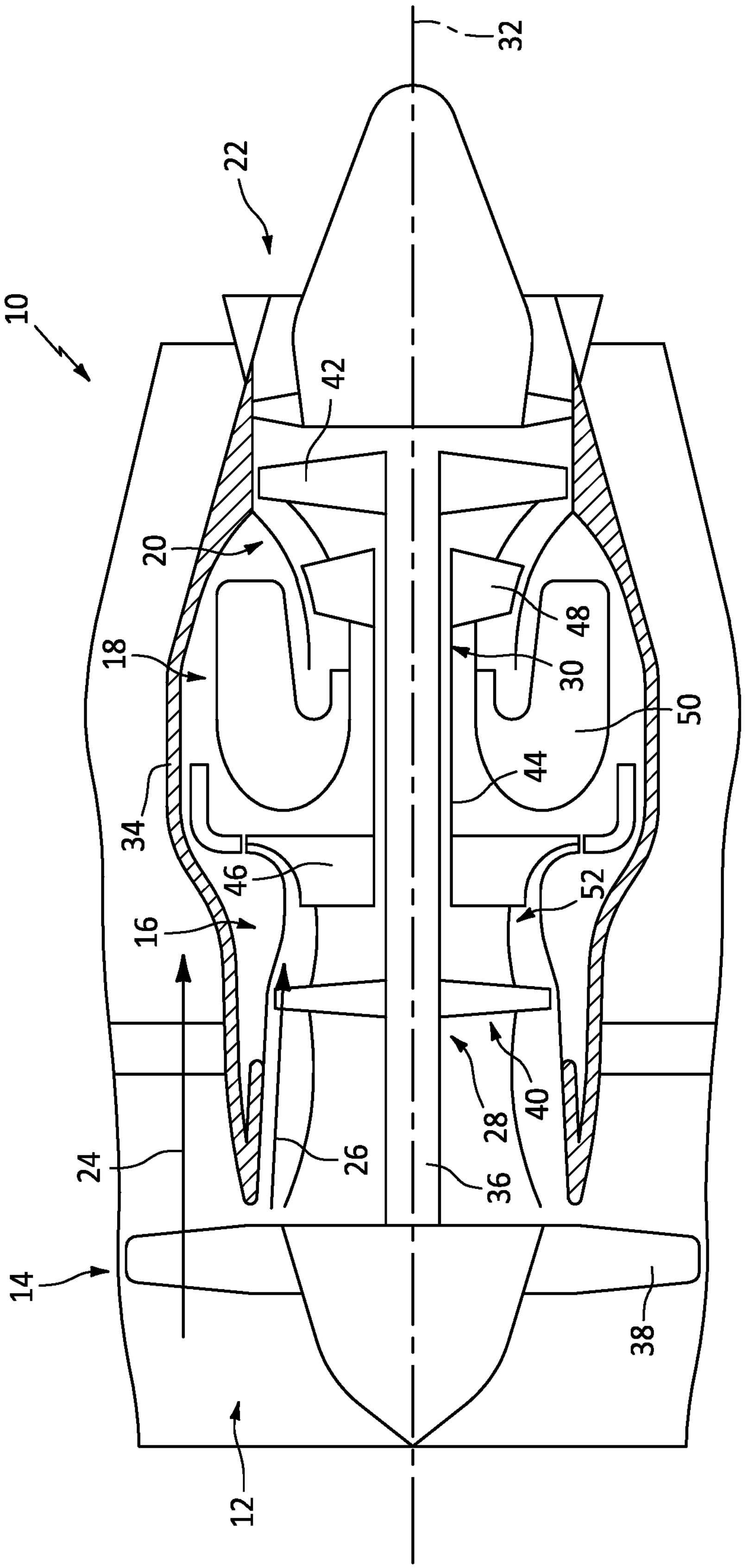
FIG. 1 illustrates a side cross-sectional view of a gas turbine engine, in accordance with one or more embodiments of the present disclosure.

FIG. 1 schematically illustrates a gas turbine engine 10. The gas turbine engine 10 of FIG. 1 is a two-spool turbofan engine that includes an inlet 12, a fan section 14, a compressor section 16, a combustor section 18, a turbine section 20, and an exhaust section 22. The fan section 14 drives air along a bypass flow path 24 while the compressor section 16 drives air along a core flow path 26 for compression and communication into the combustor section 18 and then expansion through the turbine section 20. Although the gas turbine engine 10 is depicted as a turbofan gas turbine engine in FIG. 1, it should be understood that the concepts described herein are not limited to use with turbofans as the teachings may be applied to other types of gas turbine engines, such as turboshaft gas turbine engines, turbojet gas turbine engines, turboprop gas turbine engine, etc., including those with single-spool or three-spool architectures. Moreover, aspects of the present disclosure are not limited in application to gas turbine engines and may be applicable to other aircraft propulsion systems as well.

The gas turbine engine 10 of FIG. 1 includes a low-pressure spool 28 and a high-pressure spool 30 mounted for rotation about a longitudinal centerline 32 (e.g., a rotational axis) of the gas turbine engine 10 relative to an engine static structure 34 (e.g., an engine case). The low-pressure spool 28 includes a low-pressure shaft 36 that interconnects a fan 38, a low-pressure compressor 40, and a low-pressure turbine 42. The high-pressure spool 28 includes a high-pressure shaft 44 that interconnects a high-pressure compressor 46 and a high-pressure turbine 48. It is to be understood that "low pressure" and "high pressure" or variations thereof as used herein are relative terms indicating that the high pressure is greater than the low pressure. An annular combustor 50 is disposed between the high-pressure compressor 46 and the high-pressure turbine 48 along the longitudinal centerline 32. The low-pressure shaft 36 and the high-pressure shaft 44 are concentric and rotate about the longitudinal centerline 32.

Airflow along the core flow path 26 is compressed by the low-pressure compressor 40, then the high-pressure compressor 46, mixed and burned with fuel in the combustor 50, and then expanded over the high-pressure turbine 48 and the low-pressure turbine 42. The low-pressure turbine 42 and the high-pressure turbine 48 rotationally drive the low-pressure spool 28 and the high-pressure spool 30, respectively, in response to the expansion.

During gas turbine engine operation, development, testing, and/or certification, it may be necessary to measure fluid flow parameters, such as fluid pressure, fluid temperature, fluid flow velocity, fluid flow swirl, etc., inside one or more fluid (e.g., air) flow paths of a gas turbine engine, such as the gas turbine engine 10. Fluid flow parameters may be measured at various stages of the gas turbine engine 10. For example, fluid flow parameters may be measured within fluid flow paths located in portions of the gas turbine engine 10 such as, but not limited to, the inlet 12, the compressor section 16 including various stages of the compressors 40, 46, the exhaust section 22, and other portions of the gas turbine engine 10 along the core flow path 26 and/or the bypass flow path 24. The gas turbine engine 10 includes at least one measurement system 52 configured to measure fluid flow parameters within a respective fluid flow path of the gas turbine engine 10.

Figure 2:
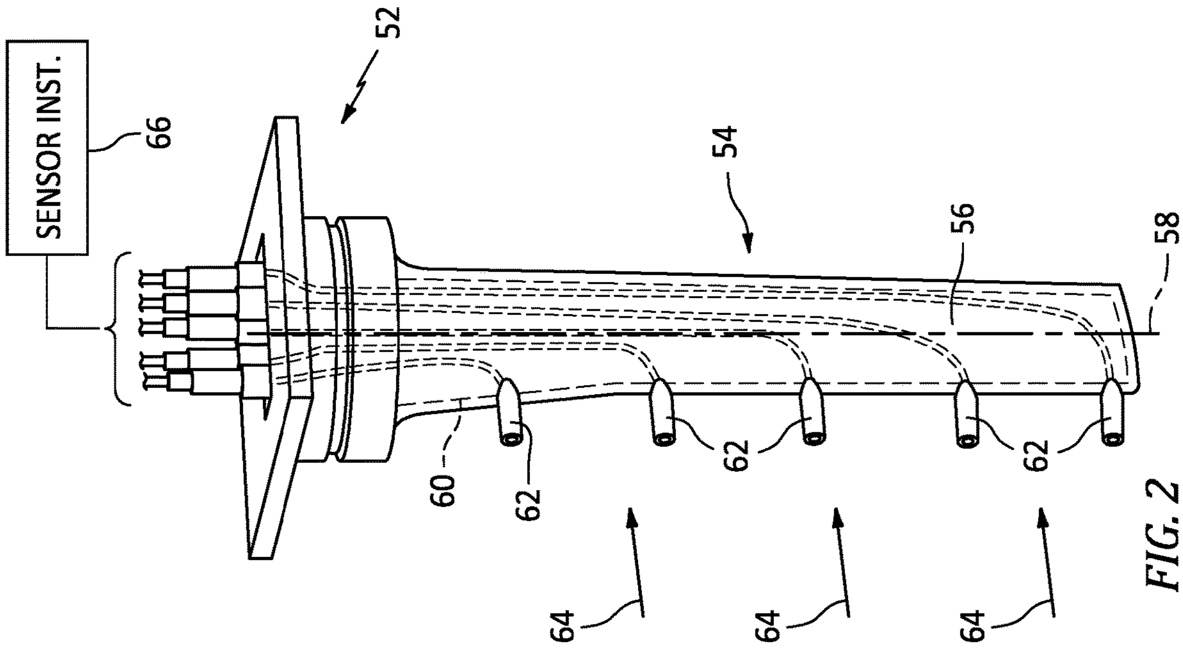
FIG. 2 illustrates perspective view of a probe, in accordance with one or more embodiments of the present disclosure.
Figure 3:
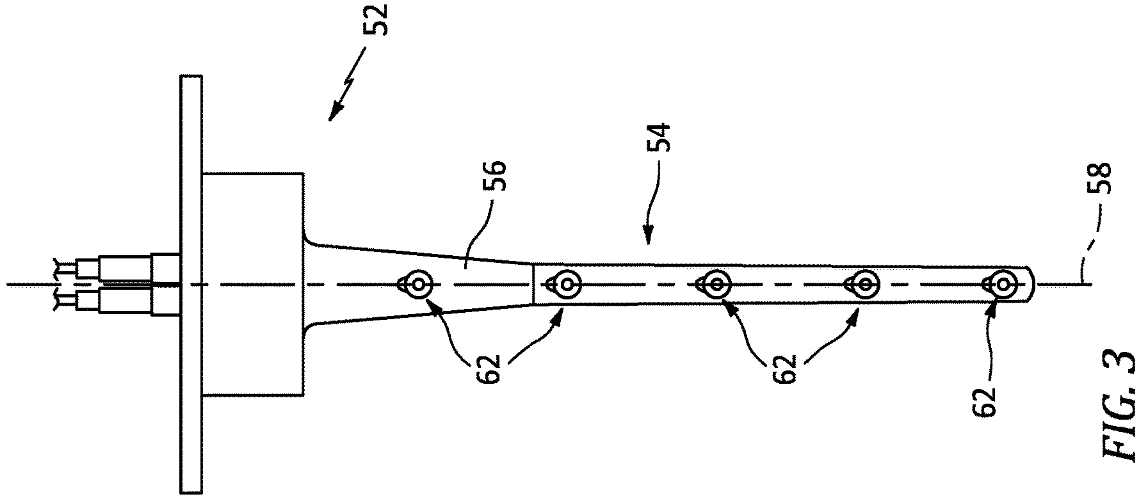
FIG. 3 illustrates a front view of the pressure of FIG. 2, in accordance with one or more embodiments of the present disclosure.

Referring to FIGS. 2 and 3, the measurement system 52 includes one or more probes 54 disposed in a fluid flow path (e.g., the core flow path 26 of the gas turbine engine 10) to sample fluid (e.g., sensed fluid flow) within the fluid flow path. A non-limiting example of a probe 54 for the measurement system 52 is shown in FIGS. 2 and 3. The probe 54 includes a probe body 56 extending lengthwise along a probe axis 58. The probe body 56 defines an internal cavity 60 of the probe 54. The probe 54 may be used to measure a total pressure (sometimes referred to as "stagnation pressure" or "pitot pressure") of the fluid within the fluid flow path. Constituents of total pressure, such as the static pressure and the dynamic pressure (also known as "velocity pressure") of the fluid, may additionally be determined using the probe 54.

The pressure probe 54 of FIGS. 2 and 3 includes a plurality of sensor inlet ports 62 extending through the probe body 56. The probe 54 may be configured as a "rake" with the plurality of sensor inlet ports 62 axially spaced along the probe axis 58. In some embodiments, the plurality of sensor inlet ports 62 may be substantially aligned with a fluid flow direction (schematically illustrated in FIG. 2 as the flow direction 64) of the fluid traversing the fluid flow path. In other words, the plurality of sensor inlet ports 62 may face a common fluid flow direction. In some embodiments, the plurality of sensor inlet ports 62 may face different directions from one another depending, for example, on the expected fluid flow direction 64 of the fluid traversing the fluid flow path. For example, where the fluid experiences vorticity or rotation along the fluid flow path such that the fluid flow direction 64 varies, the plurality of sensor inlet ports 62 may be configured to face different directions to accommodate the varying fluid flow direction 64. In some embodiments, the plurality of sensor inlet ports 62 may be configured as Pitot probes (also known as a "Pitot tubes"). The sensor inlet ports may be configured as Kiel probes, which are a variation of the Pitot probes having an inlet protected by a shroud, thereby making the Kiel probe configuration less sensitive to changes in yaw angle. Accordingly, the Kiel probe configuration may be particularly useful when the sensor inlet port alignment with the fluid flow direction 64 is variable or imprecise. However, the present disclosure is not limited to any particular configuration of the plurality of sensor inlet ports 62.

The measurement system 52 includes sensor instrumentation 66 in fluid communication with the plurality of sensor inlet ports 62. The sensor instrumentation 66 is configured to receive the sensed fluid flow (illustrated in FIG. 2 as sensed fluid flow 68) and to calculate one or more sensed fluid flow measurements such as, but not limited to, total pressure, static pressure, dynamic pressure, fluid flow velocity, fluid flow swirl angle, fluid temperature, etc. The sensor instrumentation 66 of FIG. 2 is located outside of the probe 54. The sensor instrumentation 66 may be located internal or external to the gas turbine engine 10.

Development, testing, and/or certification of a gas turbine engine, such as the gas turbine engine 10, may include one or more testing phases which include the measurement of fluid flow parameters within one or more fluid flow paths of the gas turbine engine. Fluid flow parameters may be measured, for example, by the measurement system 52 within annular fluid flow paths such as the bypass flow path 24 and/or the core flow path 26 of the gas turbine engine 10. The aforementioned testing phases may include testing the gas turbine engine 10 under icing conditions. An icing test may include the application of ice, water, sleet, and/or exposure to other fluids or foreign matter (e.g., within a controlled test environment such as a laboratory, testing cell, etc.) under conditions which may cause ice to form on the exterior and/or interior of the gas turbine engine 10. The gas turbine engine 10 may be subsequently operated to measure fluid flow parameters of the gas turbine engine 10 with the measurement system 52 under the pre-established icing conditions. However, the accumulation of ice, water, sleeve, and/or other fluids or foreign matter on or within the one or more probes 54 can negatively impact the performance of the measurement system 52.

Figure 4:
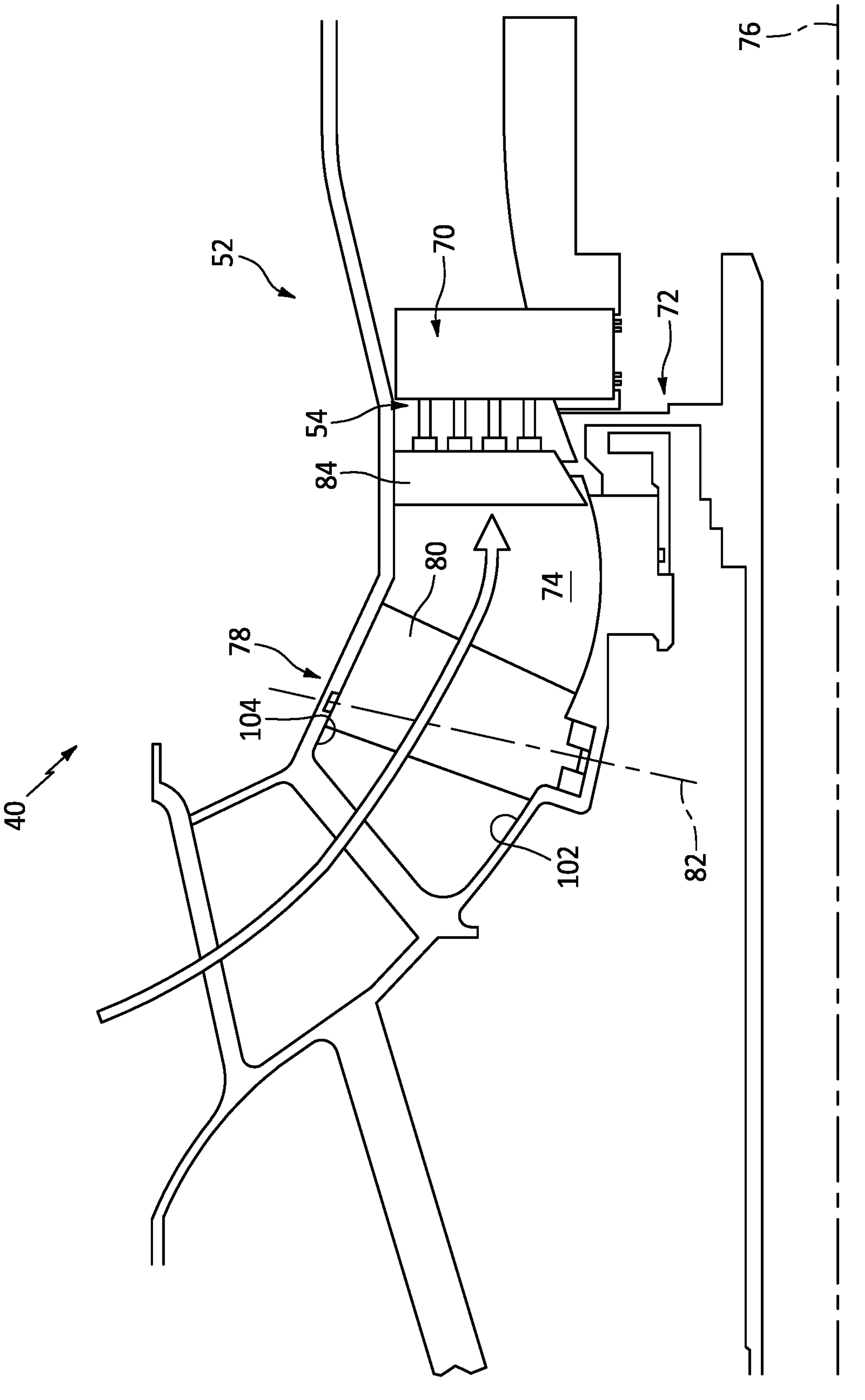
FIG. 4 illustrates a side cross-sectional view of a portion of a gas turbine engine including a measurement system, in accordance with one or more embodiments of the present disclosure.

Referring to FIGS. 4 and 5A-C, the measurement system 52 includes an instrumentation hub 70 and a shield hub 72. FIG. 4 illustrates a cross-sectional view of the instrumentation hub 70 and the shield hub 72 positioned relative to an annular fluid flow path 74 of the gas turbine engine 10. The fluid flow path 74 may include, for example, the bypass flow path 24 and/or the core flow path 26 of the gas turbine engine 10 (see FIG. 1). However, the present disclosure fluid flow path 74 is not limited to the bypass flow path 24 or the core flow path 26. The fluid flow path 74 includes and is defined between an inner radial flow path surface 102 and an outer radial flow path surface 104. The instrumentation hub 70 includes one or more probes 54 positioned within the fluid flow path 74. The plurality of sensor inlet ports 62 for each of the probes 54 may be oriented within the fluid flow path 74 to face the fluid flow direction 64 of the fluid traversing the fluid flow path 74.

The shield hub 72 includes one or more shields 84 positioned within the fluid flow path 74. Each shield 84 of the shield hub 72 is configured to be aligned with a respective probe 54 of the instrumentation hub 70 to protect (e.g., to shield) the respective probe 54 from ice, water, sleet, and/or other fluids or foreign matter during an icing test for the gas turbine engine 10. The shield hub 72 is rotatable about a rotational axis 76 such that the shields 84 may move along the entire circumferential extent of the fluid flow path 74 with respect to the rotational axis 76. The rotational axis 76 may or may not be co-axial with the longitudinal centerline 32 of the gas turbine engine 10 (see FIG. 1).

In some embodiments, the measurement system 52 may be located in a compressor such as the low-pressure compressor 40 or the high-pressure compressor 46 of the gas turbine engine 10. FIG. 4 illustrates the measurement system 52 located within the low-pressure compressor 40. The low-pressure compressor 40 of FIG. 4 includes a variable vane assembly 78 positioned upstream of the measurement system 52 with respect to the fluid flow path 74. The variable vane assembly 78 includes a plurality of variable vanes 80 circumferentially spaced about the rotational axis 76 within the fluid flow path 74. The plurality of variable vanes 80 are configured to direct fluid within the fluid flow path 74, for example, toward downstream blades of a compressor rotor assembly (not shown). Each variable vane 80 of the plurality of variable vanes 80 may be configured to rotate about a vane axis 82 to control a direction of fluid flow within the fluid flow path 74. In other words, each variable vane 80 may be rotated about the vane axis 82 to vary an angle of attack of the variable vane 80 relative to the fluid flow within the fluid flow path 74. Thus, the positions of the variable vanes 80 may impact the direction of the fluid flow which interacts with the downstream measurement system 52.

Figure 5A:
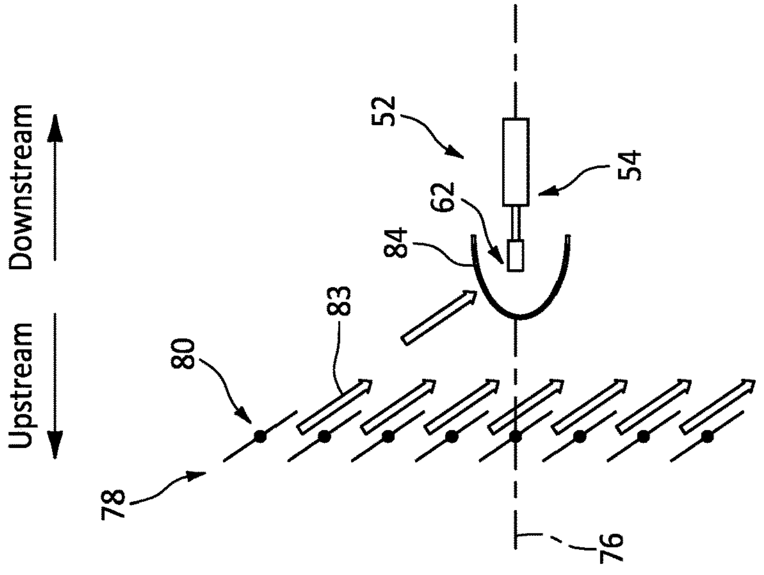
FIGS. 5A-C illustrate schematic views of a variable vane assembly and a measurement system, in accordance with one or more embodiments of the present disclosure.
Figure 5B:
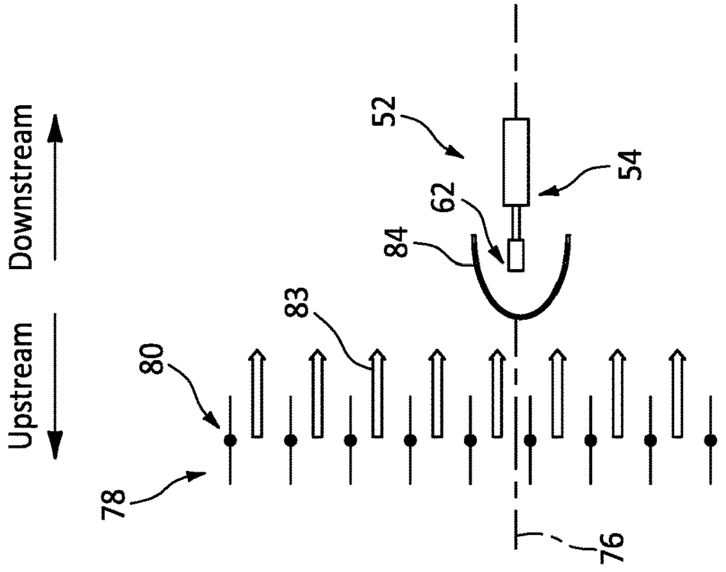
Figure 5C:
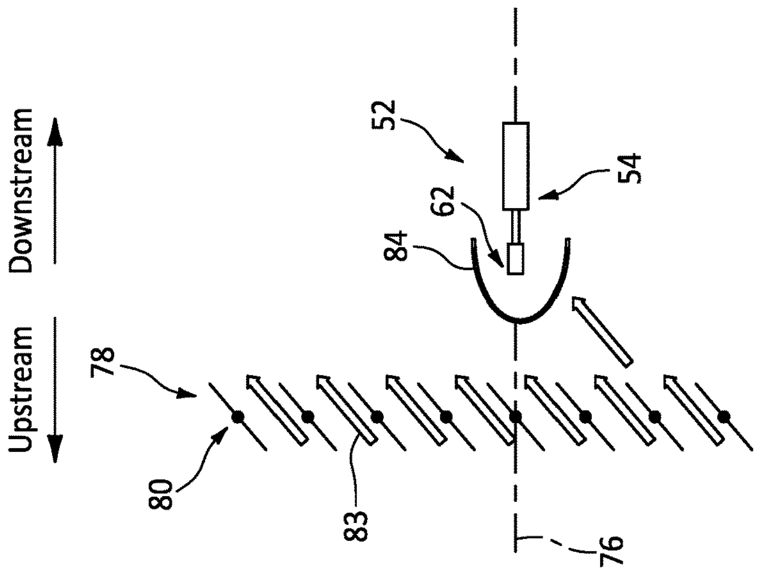

FIGS. 5A-C illustrate schematic views of exemplary orientations of variable vanes 80 of the variable vane assembly 78 with respect to the measurement system 52. For ease of understanding, the variable vanes 80 in FIGS. 5A-C are illustrated in a planar arrangement, however, it should be understood that the variable vanes 80 are circumferentially disposed about the rotational axis 76. In FIG. 5A, the variable vanes 80 are oriented to direct fluid flow (schematically illustrated as fluid flow 83) in a partially circumferential direction (e.g., a clockwise direction from upstream to downstream) relative to the rotational axis 76. In FIG. 5B, the variable vanes 80 are oriented to direct fluid flow 83 in a substantially axial direction relative to the rotational axis 76. In FIG. 5C, the variable vanes 80 are oriented to direct fluid flow 83 in a partially circumferential direction (e.g., a counterclockwise direction from upstream to downstream) relative to the rotational axis 76. Any ice, water, sleet, and/or other fluids or foreign matter entrained with the fluid flow 83 may be directed toward the sensor inlet ports 62 of the probe 54 in a plurality of different directions depending on the orientation of the variable vanes 80 of the variable vane assembly 78.

In some embodiments, therefore, each shield 84 may be configured to block or otherwise obstruct the fluid flow 83 directed towards the sensor inlet ports 62 from the plurality of different directions depending on the orientation of the variable vanes 80 of the variable vane assembly 78. For example, each shield 84 may be configured to axially overlap at least a portion of a respective probe 54 such as the sensor inlet ports 62. As shown in FIGS. 5A-C, each shield 84 may have an arcuate cross-sectional shape. Each shield 84 may have a downstream side 86 facing the probe 54 and an upstream side 88 facing away from the probe 54. The downstream side 86 may have a generally concave cross-sectional shape while the upstream side 88 may have a generally convex cross-sectional shape. The present disclosure, however, is not limited to the particular shield 84 configuration illustrated in FIGS. 5A-C. Moreover, while the shields 84 of FIGS. 5A-C are described with respect to the protection of probes 54 downstream of a variable vane assembly 78, it should be understood that the shield hub 72 and shields 84 of the present disclosure are not limited to use with variable vane assemblies 78 aspects of the present disclosure shields 84 may also be relevant to measurement of fluid parameters in fluid systems experiencing substantial amounts of fluid swirl or fluid flow instability.

Figure 6:
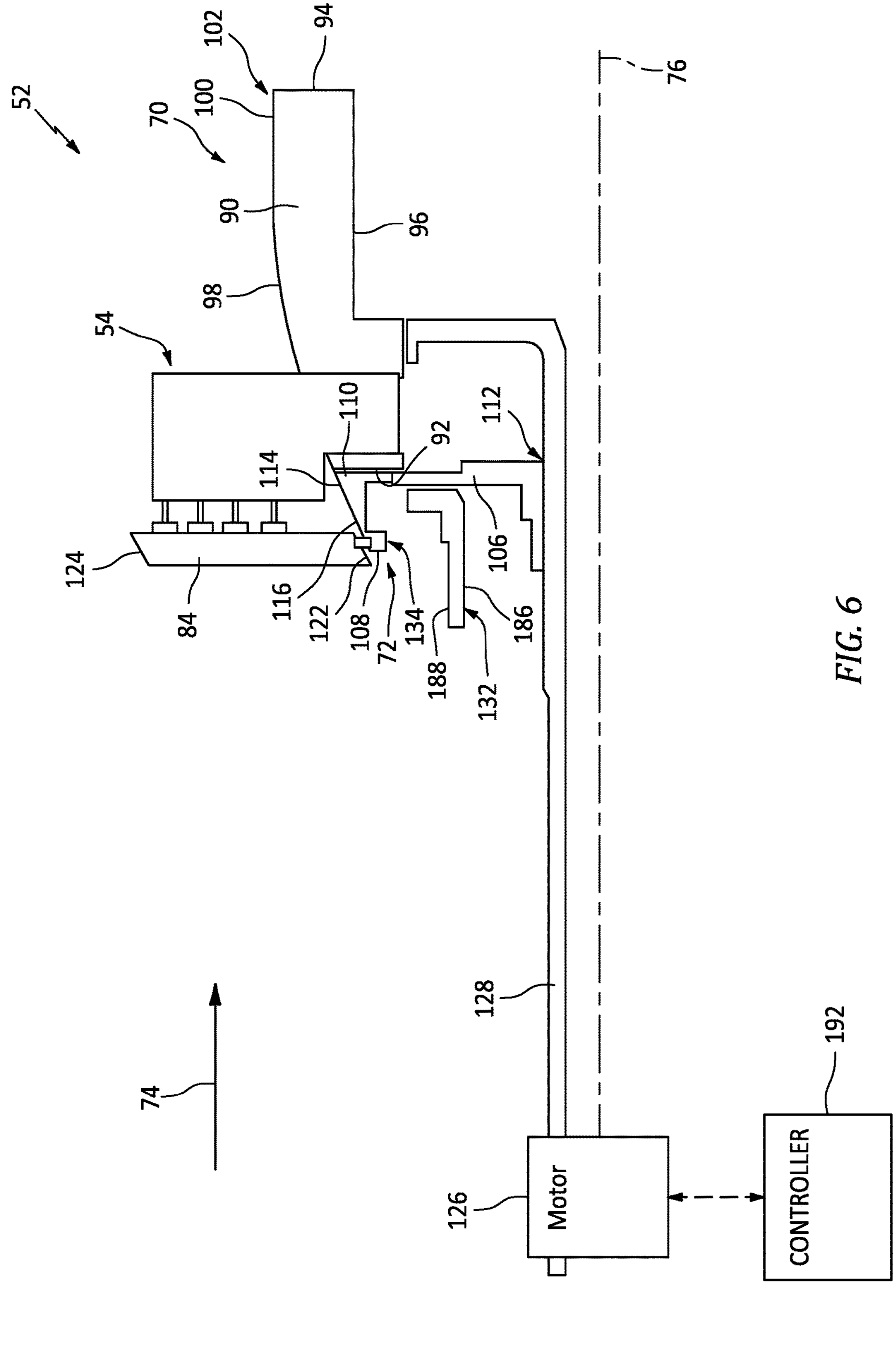
FIG. 6 illustrates a side cross-sectional view of a measurement system, in accordance with one or more embodiments of the present disclosure.
Figure 8:
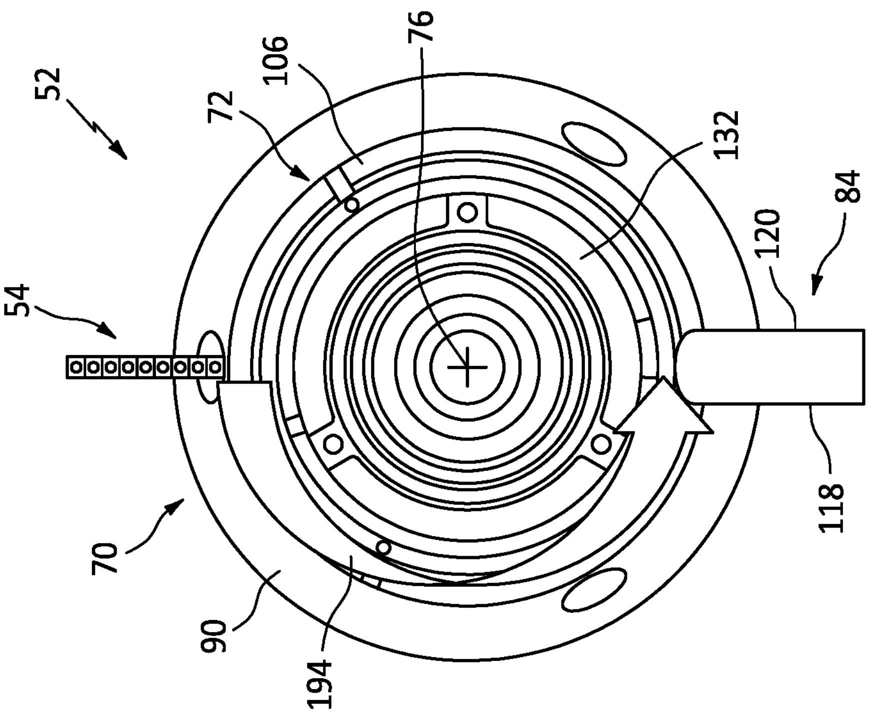
FIG. 8 illustrates a front view of the measurement system of FIG. 6, in accordance with one or more embodiments of the present disclosure.
Figure 7:
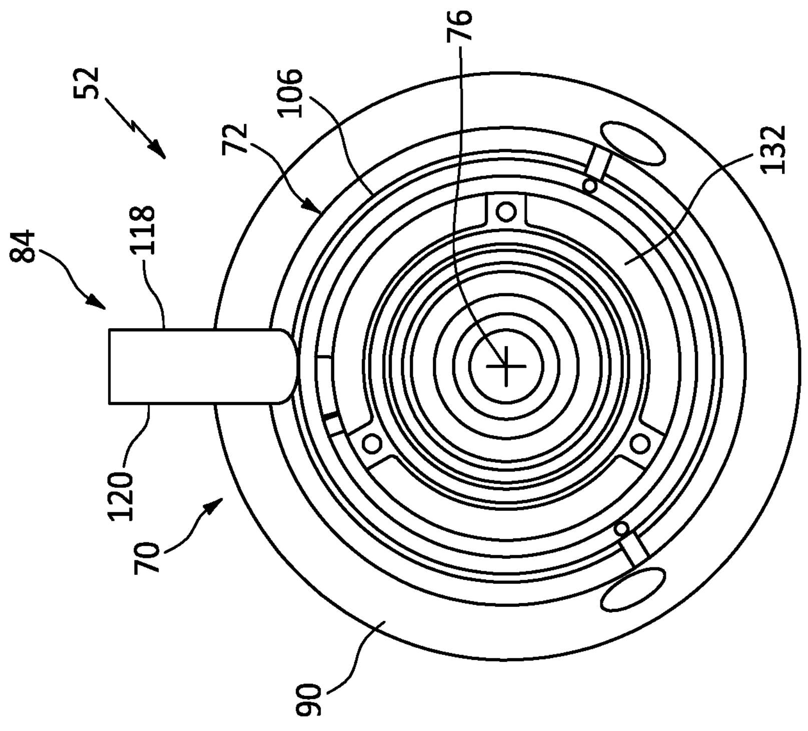
FIG. 7 illustrates a front view of the measurement system of FIG. 6, in accordance with one or more embodiments of the present disclosure.
Figure 10:
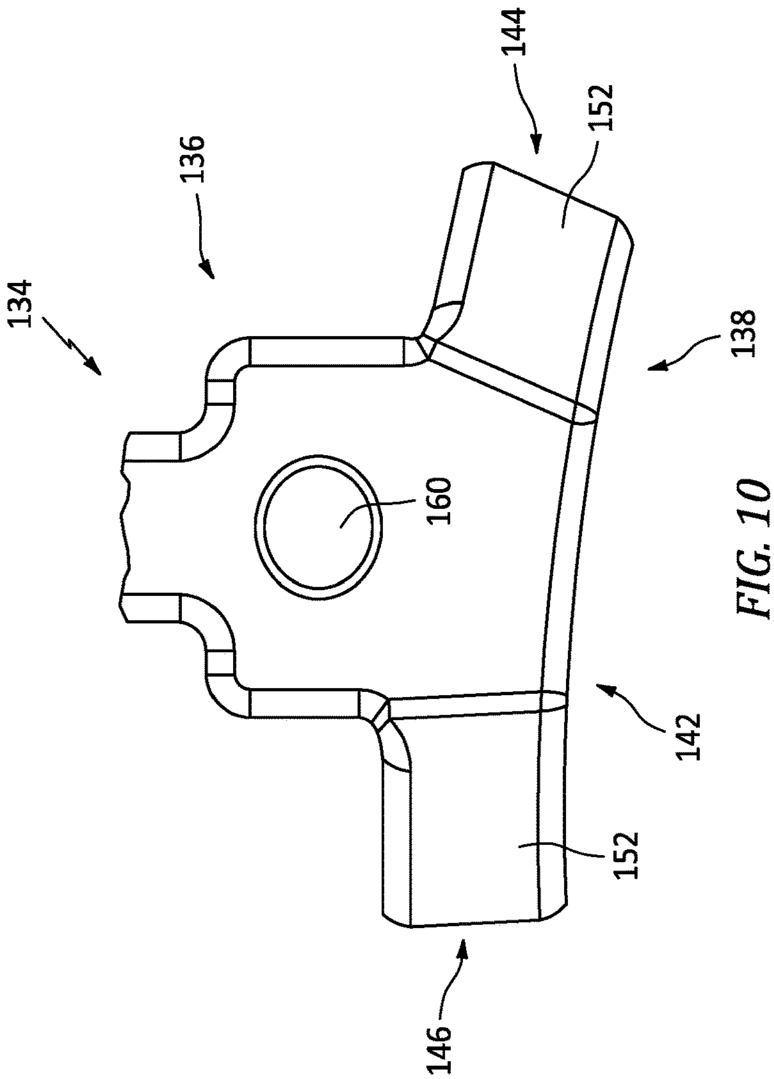
FIG. 10 illustrates a perspective view of a portion of the shield biasing assembly of FIG. 9, in accordance with one or more embodiments of the present disclosure.

Referring to FIGS. 6-8, the instrumentation hub 70 may include an annular body 90 including a first axial end 92 and a second axial end 94 opposite the first axial end 92. The annular body 90 may further include an inner radial side 96 facing the rotational axis 76 and an outer radial side 98 opposite the inner radial side 96. The annular body 90 may include an outer radial surface 100 located along the outer radial side 98 of the annular body 90. The outer radial surface 100 may define a portion of the fluid flow path 74 between the first axial end 92 and the second axial end 94 of the annular body 90. In other words, the outer radial surface 100 of the annular body 90 may form a portion of the inner radial flow path surface 102. Each of the probes 54 may extend radially outward from the outer radial surface 100 into the fluid flow path 74. The instrumentation hub 70 of FIG. 8 is illustrated with one probe 54, however, the present disclosure instrumentation hub 70 is not limited to any particular number of probes 54. For example, in some embodiments, the instrumentation hub 70 may include a plurality of probes 54 circumferentially spaced about the instrumentation hub 70.

The shield hub 72 may include an annular body 106 disposed axially adjacent the annular body 90 of the instrumentation hub 70. The annular body 106 of the shield hub 72 may include a first axial end 108 and a second axial end 110 opposite the first axial end 108. The annular body 106 may further include an inner radial side 112 facing the rotational axis 76 and an outer radial side 114 opposite the inner radial side 112. The annular body 106 may include an outer radial surface 116 located along the outer radial side 114 of the annular body 106. The outer radial surface 116 may define a portion of the fluid flow path 74 between the first axial end 108 and the second axial end 110 of the annular body 106. In other words, the outer radial surface 116 of the annular body 106 may form a portion of the inner radial flow path surface 102. Each of the shields 84 may extend in a direction radially outward from the outer radial surface 116 into the fluid flow path 74. The shield hub 72 of FIGS. 7 and 8 is illustrated with one shield 84. The present disclosure shield hub 72 is not limited to any particular number of shields 84, although the number of shields 84 may be equal to the number of probes 54 of the instrumentation hub 70. For example, in some embodiments, the shield hub 72 may include a plurality of shields 84 circumferentially spaced about the shield hub 72.

Each shield 84 may extend between a first circumferential end 118 and a second circumferential end 120 opposite the first circumferential end 118. Each shield 84 may further extend between a first radial end 122 and a second radial end

124 opposite the first radial end 122. Each shield 84 may be mounted to the shield hub 72 proximate the first radial end 122. The second radial end 124 of each shield 84 may be positioned proximate the outer radial flow path surface 104 of the fluid flow path 74 (see FIG. 4). Accordingly, each shield 84 may radially extend substantially all of a radial distance between the inner radial flow path surface 102 and the outer radial flow path surface 104 of the fluid flow path 74. The shields 84 are configured to be radially aligned with the probes 54 of the instrumentation hub 70. Thus, the shields 84 are configured to at least partially radially and circumferentially overlap the probes 54.

The measurement system 52 may include a motor 126. The motor 126 may be connected to the shield hub 72 by a shaft 128. The shaft 128 may be an annular shaft disposed about the rotational axis 76. In some embodiments, the shaft 128 may surround one or more other shafts of the gas turbine engine 10 such as the low-pressure shaft 36. The shaft 128 of FIG. 6 may be connected to the inner radial side 112 of the annular body 106 of the shield hub 72, however, the present disclosure is not limited to this particular configuration of the shaft 128 and the shield hub 72. The motor 126 is configured to effect rotation of the shield hub 72 about the rotational axis 76 via the shaft 128. As shown in FIG. 6, the motor 126 may be positioned axially forward of the shield hub 72. However, the motor 126 may have any suitable position and/or orientation relative to the shield hub 72 as necessary to accommodate various gas turbine engine configurations. The instrumentation hub 70 of FIG. 6 is configured to be substantially fixed relative to the rotational axis 76. Accordingly, rotation of the shield hub 72 by the motor 126 about the rotational axis 76 will also cause relative rotation between the shield hub 72 and the instrumentation hub 70. In other words, the shield hub 72 may be rotatable about the rotational axis 76 independent of the instrumentation hub 70, for example, in first rotation direction 194, as shown in FIG. 8. In some embodiments, however, the shaft 128 may additionally be coupled to the instrumentation hub 70 and the instrumentation hub 70 may be configured to rotate about the rotational axis 76, for example, to measure fluid flow parameters along the entire circumferential extent of the fluid flow path 74 with respect to the rotational axis 76. In some embodiments, the instrumentation hub 70 and the shield hub 72 may be selectively coupled to the shaft using, for example, a clutch or keying mechanism (not shown) so that the motor 126 may be used to rotate the shield hub 72 and the instrumentation hub 70 together (e.g., co-rotation) or independent of one another. Alternatively, in some embodiments, the instrumentation hub 70 may be rotated by a second motor (not shown) discrete from the motor 126.

The measurement system 52 further includes an annular cam hub 132 disposed about the rotational axis 76. The cam hub 132 includes an inner radial side 186 and an outer radial side 188 opposite the inner radial side 186. The cam hub 132 may be directly or indirectly mounted to a fixed structure of the gas turbine engine 10 such as a casing (e.g., a compressor casing). The cam hub 132 may, therefore, be understood to be fixed relative to the rotational axis 76. Accordingly, the cam hub 132 may also be fixed relative to the instrumentation hub 70. The fixed structure to which the cam hub 132 is mounted may define all or a portion of the inner radial flow path surface 102 and/or the outer radial flow path surface 104. The cam hub 132 may be positioned axially adjacent the shield hub 72. The cam hub 132 may further be positioned radially inside of the shields 84 of the shield hub 72, for example, radially between the shields 84 and the shaft 128.

Figure 9:
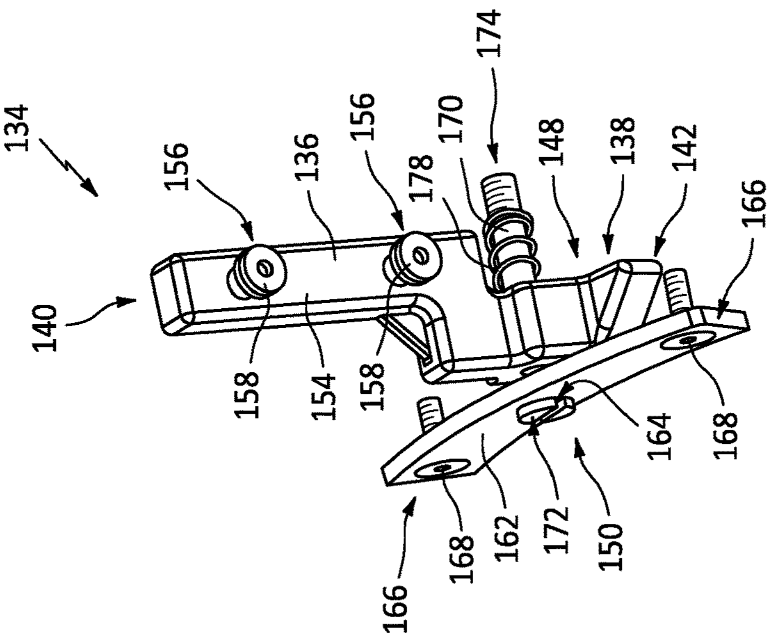
FIG. 9 illustrates a perspective view of a shield biasing assembly for a measurement system, in accordance with one or more embodiments of the present disclosure.

Referring to FIGS. 6 and 9-12, the shield hub 72 may further include one or more shield biasing assemblies 134. Each shield biasing assembly 134 may be configured to mount a shield 84 to the shield hub 72. At least a portion of each shield biasing assembly 134 may be positioned within a respective cavity 180 defined within the shield hub 72 as shown, for example, in FIG. 12. The shield biasing assembly 134 includes a shield arm 136. The shield arm 136 extends between an inner radial end 138 and an outer radial end 140. The shield arm 136 further extends between a first axial end 148 and a second axial end 150 opposite the first axial end 148. The shield arm 136 includes a shield arm follower 142 disposed along the inner radial end 138. The shield arm follower 142 extends between a first circumferential end 144 and a second circumferential end 146 opposite the first circumferential end 144. One or both of the first circumferential end 144 and the second circumferential end 146 may include a ramped surface 152. The ramped surface 152 may be oriented so that a circumferential span of the shield arm follower 142 increases in a direction from the second axial end 150 toward the first axial end 148. The shield arm 136 may further include an arm portion 154. The arm portion 154 may extend from the shield arm follower 142 to the outer radial end 140 of the shield arm 136. The arm portion 154 may extend outward from the cavity 180 of the shield hub 72 and at least a portion of the arm portion 154 may be located radially outside of the shield hub 72. The arm portion 154 may include one or more fastener apertures 156 configured to allow a respective shield 84 to be mounted to the arm portion 154 using one or more fasteners 158. The shield arm 136 may further include a slider aperture 160. The slider aperture 160 may extend through the shield arm 136 from the first axial end 148 to the second axial end 150. The slider aperture 160 may be located within the shield arm follower 142 of the shield arm 136, as shown in FIG. 9, however, the present disclosure is not limited to this particular location of the slider aperture 160 with respect to the shield arm 136.

The shield biasing assembly 134 may further include a back plate 162 configured for securely positioning the shield arm 136 relative to the shield hub 72. The back plate 162 may include a slider aperture 164 configured to be aligned with the slider aperture 160 of the shield arm 136. The back plate 162 may further include one or more fastener apertures 166 configured to allow the back plate 162 to be mounted to the shield hub 72 using one or more fasteners 168.

Figure 12:
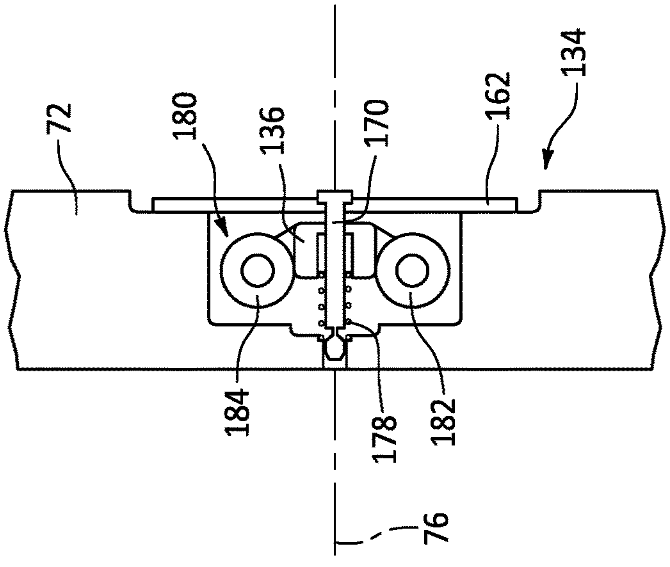
FIG. 12 illustrates top cross-sectional view of the shield biasing assembly of FIG. 9, in accordance with one or more embodiments of the present disclosure.

The shield biasing assembly 134 may further include a slider rod 170. The slider rod 170 may extend between a first end 172 and a second end 174 opposite the first end 172. In some embodiments, the slider rod 170 may be configured with an enlarged head portion located at the first end 172 and a threaded portion located at the second end 174. The slider rod 170 may extend through the slider aperture 160 of the shield arm 136 and the slider aperture 164 of the back plate 162. The slider rod 170 may be fixedly connected to the shield hub 72. For example, the threaded portion located at the second end 174 of the slider rod 170 may be retained within a threaded aperture 176 of the shield hub 72 which is positioned contiguous with the cavity 180, as shown in FIG. 12. Accordingly, the slider rod 170 may be fixedly positioned between the shield hub 72 and the back plate 162. The shield arm 136 may be configured to translate (e.g., axially translate) along the slider rod 170 between the shield hub 72 and the back plate 162. In some embodiments, the shield biasing assembly 134 may further include a spring 178 disposed about the slider rod 170. The spring 178 may be positioned between, and in contact with, the shield arm 136 and the shield hub 72. The spring 178 may be configured to bias the shield arm 136 away from the shield hub, for example, in an axially aft direction. The shield arm 136, biased by the spring 178, may therefore have a default position in which the shield arm 136 may be positioned in contact with or proximate the back plate 162 as shown, for example, in FIG. 12.

The shield biasing assembly 134 may further include a first roller 182 and a second roller 184. The first roller 182 and the second roller 184 may be rotatably mounted to the shield hub 72. The first roller 182 and the second roller 184 may further be positioned within the cavity 180 defined by the shield hub 72. The first roller 182 and the second roller 184 may be positioned on opposing circumferential sides of the shield arm 136. The shield arm 136 may, therefore, be configured to translate (e.g., axially translate) along the slider rod 170 between and in contact with the first roller 182 and the second roller 184. The first roller 182 and the second roller 184 may ensure alignment of the shield arm 136 as the shield arm 136 translates along the slider rod 170. For example, the first roller 182 and the second roller 184 may prevent or substantially prevent the shield arm 136 from rotating about the slider rod 170.

Figure 13:
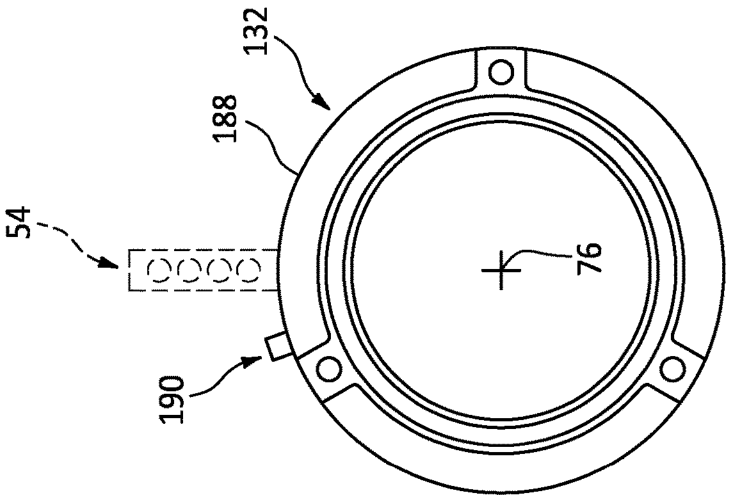
FIG. 13 illustrates a front view of a fixed cam hub for a measurement system, in accordance with one or more embodiments of the present disclosure.
Figure 11:
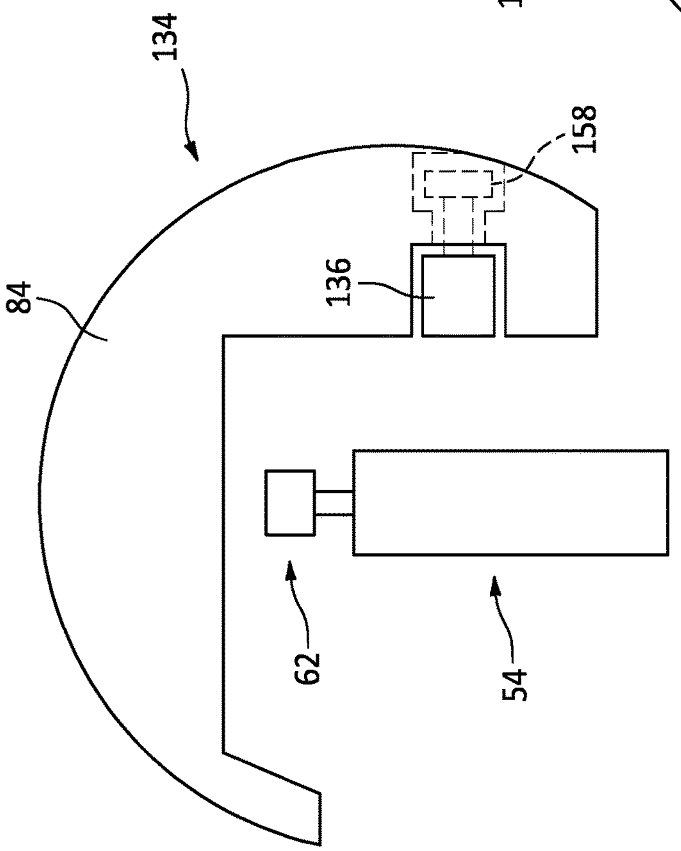
FIG. 11 illustrates a top cross-sectional view of portions of the shield biasing assembly of FIG. 9, a shield, and a probe, in accordance with one or more embodiments of the present disclosure.

Referring to FIG. 13, the cam hub 132 includes one or more cams 190 mounted to the cam hub 132. The cam 190 may be mounted to the outer radial side 188 of the cam hub 132 and may extend radially outward from the outer radial side 188. The cam 190 is rotatably mounted to the cam hub 132. The cam 190 may be configured as a rotatable wheel, a sphere, or any other suitable shape. As shown in FIG. 13, the cam 190 may be circumferentially offset from a respective probe 54 of the instrumentation hub 70 with respect to the rotational axis 76. As will be discussed in further detail, each cam 190 is positioned so that a respective shield biasing assembly 134 is configured to engage the cam 190 as the shield hub 72 rotates about the rotational axis 76. The cam hub 132 of FIG. 13 is illustrated with one cam 190. The cam hub 132 of the present disclosure is not limited to any particular number of cams 190, although the number of cams 190 may be equal to the number of probes 54 of the instrumentation hub 70. For example, in some embodiments, the cam hub 132 may include a plurality of cams 190 circumferentially spaced about the cam hub 132.

In some embodiments, the measurement system 52 may include a controller 192. The controller 192 may be in signal communication with the motor 126 and/or the probes 54. In some embodiments, the controller 192 may include the sensor instrumentation 66. The controller 192 may include any type of computing device, computational circuit, or any type of processor or processing circuit capable of executing a series of instructions that are stored in memory. For example, the controller 192 may be configured to execute control program code directed to the operation of the motor 126 and/or sensor instrumentation 66. The controller 192 may include multiple processors and/or multicore CPUs and may include any type of processor, such as a microprocessor, digital signal processor, co-processors, a micro-controller, a microcomputer, a central processing unit, a field programmable gate array, a programmable logic device, a state machine, logic circuitry, analog circuitry, digital circuitry, etc., and any combination thereof. The instructions stored in memory may represent one or more algorithms for controlling the aspects of the gas turbine engine 10, and the stored instructions are not limited to any particular form (e.g., program files, system data, buffers, drivers, utilities, system programs, etc.) provided they can be executed by the controller 192. The memory may be a non-transitory computer readable storage medium configured to store instructions that when executed by one or more processors, cause the one or more processors to perform or cause the performance of certain functions. The memory may be a single memory device or a plurality of memory devices. A memory device may include a storage area network, network attached storage, as well a disk drive, a read-only memory, random access memory, volatile memory, non-volatile memory, static memory, dynamic memory, flash memory, cache memory, and/or any device that stores digital information. One skilled in the art will appreciate, based on a review of this disclosure, that the implementation of the controller 192 may be achieved via the use of hardware, software, firmware, or any combination thereof. The controller 192 may include input and output devices (e.g., a keyboard, a touch screen, etc.) that enable the operator to input and/or receive instructions or data.

Figure 17:
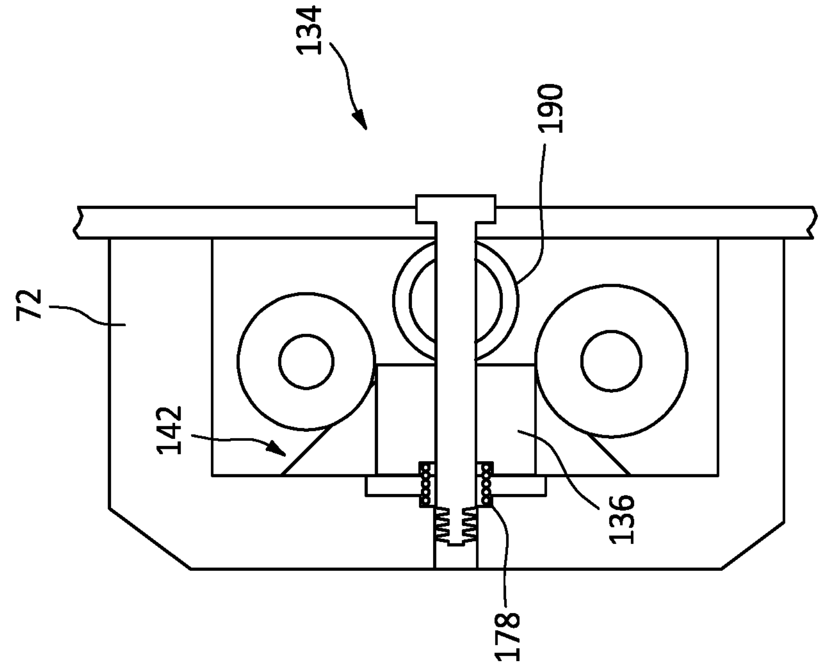
FIG. 17 illustrates a top cutaway view of a portion of the measurement system with the shield biasing assembly in a second axial position, in accordance with one or more embodiments of the present disclosure.
Figure 18C:
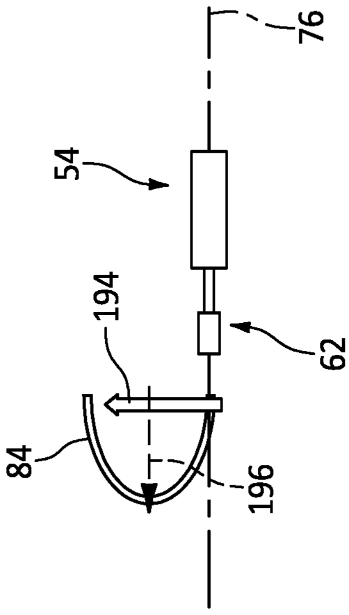
FIGS. 18A-D illustrate schematic views of a sequence of shield hub positions for a measurement system, in accordance with one or more embodiments of the present disclosure.
Figure 18D:
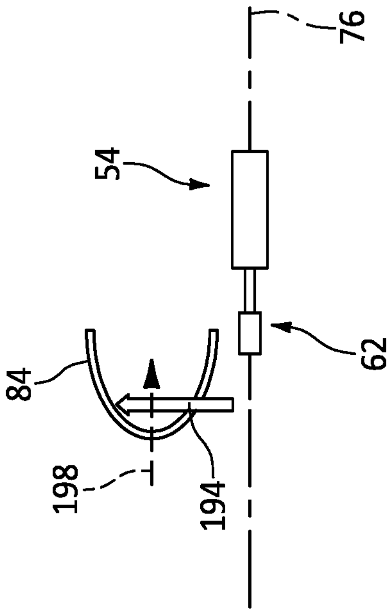
Figure 18A:
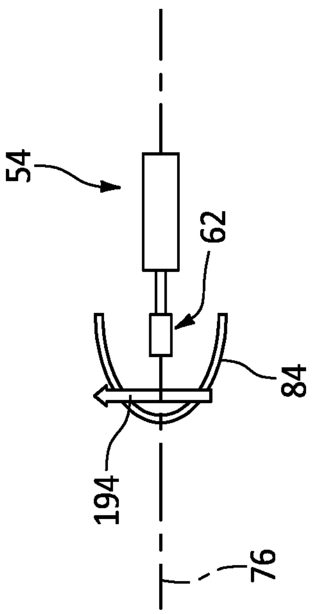
Figure 18B:
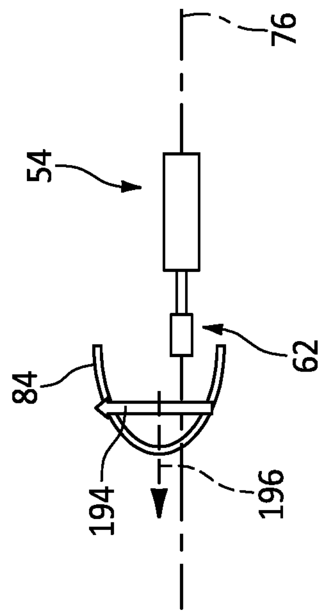
Figure 19:
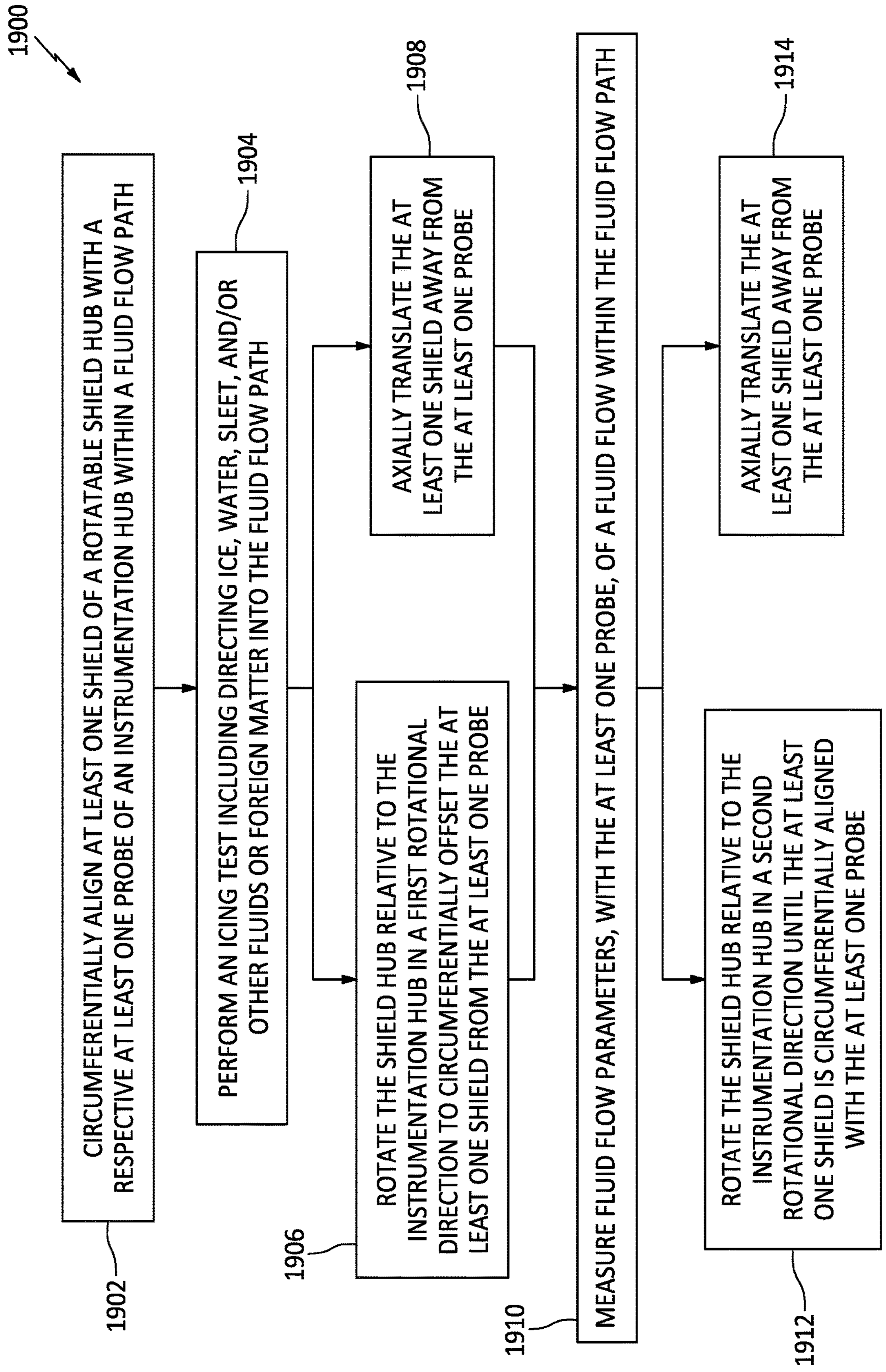
FIG. 19 illustrates a block diagram of a method for operating a measurement system for an aircraft gas turbine engine, in accordance with one or more embodiments of the present disclosure.

Referring to FIGS. 6 and 14-19, a method 1900 for operating a measurement system is provided. FIG. 19 illustrates a flowchart of the method 1900. The method 1900 may be performed using a measurement system such as, but not limited to, the measurement system 52 of FIGS. 4-13. The controller 192 may execute instructions stored in memory, thereby causing the controller 192 to perform one or more steps of the method 1900. However, the present disclosure method 1900 is not limited to use with the measurement system 52 or controller 192. FIGS. 14-17 and 18A-D illustrate portions of the measurement system 52 of at various stages of the method 1900. Unless otherwise noted herein, it should be understood that the steps of method 800 are not required to be performed in the specific sequence in which they are discussed below and, in various embodiments, the steps of method 800 may be performed separately or simultaneously.

In Step 1902, each of the shields 84 is circumferentially aligned with a respective one of the probes 54 so that the shields 84 are positioned to protect each of the probes 54 (see, e.g., FIG. 7). In other words, the shields 84 may be positioned block, deflect, or otherwise obstruct the passage of fluid and/or materials along the fluid flow path 74 which might otherwise strike or become deposited on or inside the probes 54. Each of the shields 84 may be circumferentially aligned with a respective one of the probes 54 by operating the motor 126 to rotate the shield hub 72 relative to the instrumentation hub 70 about the rotational axis 76. With each of the shields 84 circumferentially aligned with a respective one of the probes 54, each of the shields 84 may also axially overlap at least a portion of the respective one of the probes 54 as shown, for example, in FIG. 18A.

In Step 1904, an icing test is performed on the gas turbine engine 10. The icing test may include directing ice, water, sleet, and/or other fluids or foreign matter into one or more fluid flow paths, such as the fluid flow path 74, of the gas turbine engine 10 including, for example, the bypass flow path 24 or the core flow path 26.

In Step 1906, the shield hub 72 is rotated relative to the instrumentation hub 70 in a first rotational direction 194 to circumferentially offset each shield 84 from each respective probe 54 (see, e.g., FIG. 8). Each of the shields 84 may be circumferentially offset from each respective probe 54 by operating the motor 126 to rotate the shield hub 72 relative to the instrumentation hub 70 about the rotational axis 76.

In Step 1908, each shield 84 is axially translated away from each respective probe 54. As shown in FIGS. 18B and 18C, each shield 84 may translate in a first axial direction 196 (e.g., a forward axial direction). Axial translation of each shield 84 allows the shield hub 72 to rotate in the first rotational direction 194, as discussed above in Step 1906, without obstruction of the shields 84 by the probes 54. In other words, as the shield hub 72 rotates in the first rotational direction 194 the shields 84 translate to an axial position in which the shields 84 are axially offset from the respective probes 54. Axial translation of each shield 84 is effected by a respective shield biasing assembly 134 in response to rotation of the shield hub 72.

Figure 15:
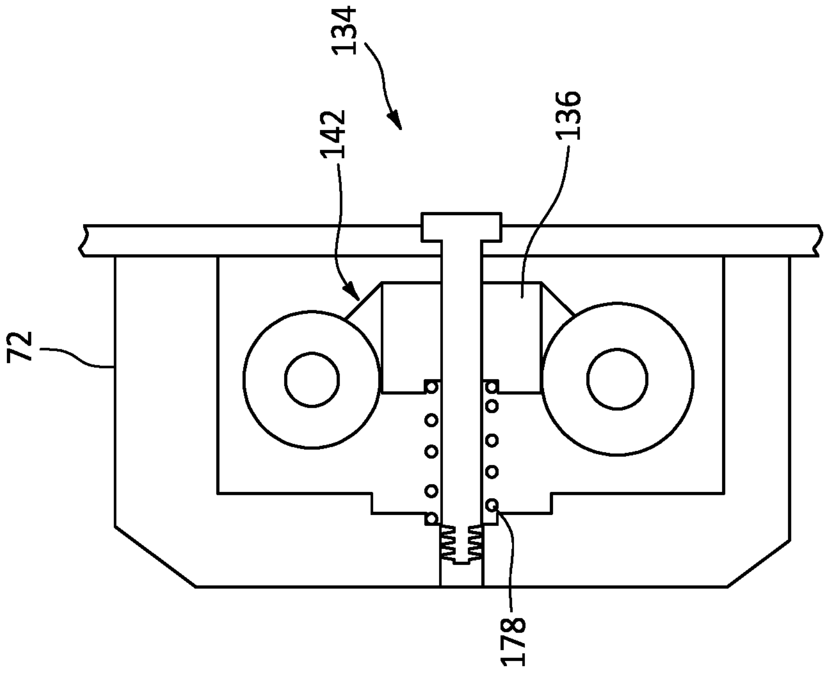
FIG. 15 illustrates a top cutaway view of a portion of the measurement system with the shield biasing assembly in a first axial position, in accordance with one or more embodiments of the present disclosure.
Figure 14:
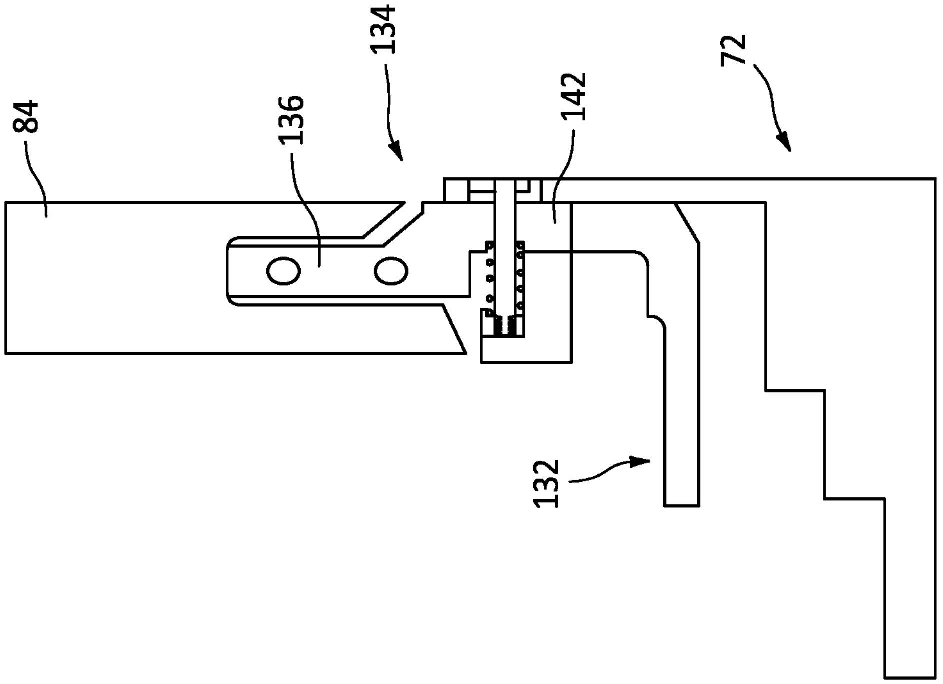
FIG. 14 illustrates a side cross-sectional view of a portion of the measurement system with the shield biasing assembly in a first axial position, in accordance with one or more embodiments of the present disclosure.
Figure 16:
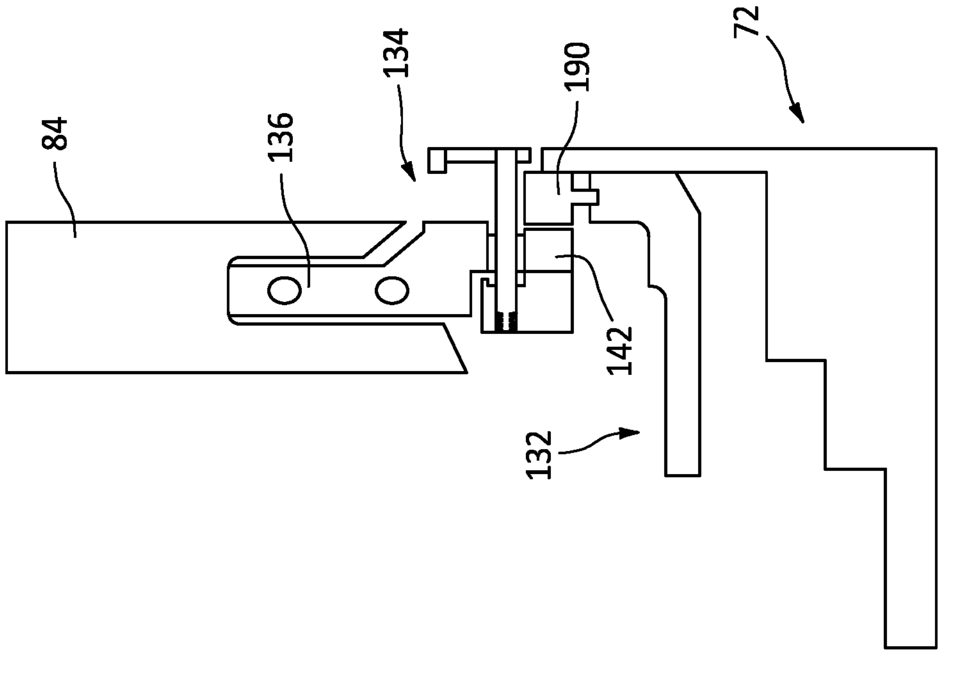
FIG. 16 illustrates a side cross-sectional view of a portion of the measurement system with the shield biasing assembly in a second axial position, in accordance with one or more embodiments of the present disclosure.

As previously discussed, each cam 190 of the cam hub 132 is positioned so that a respective shield biasing assembly 134 is configured to engage the cam 190 as the shield hub 72 rotates about the rotational axis 76. FIGS. 14 and 15 illustrate a position of the shield arm 136 and associated shield 84 in which the shield arm 136 is not engaged with a cam 190 of the cam hub 132. The position of the shield 84 in FIGS. 14 and 15 may substantially correspond with the position of the shield 84 in FIG. 18A. Referring to FIGS. 16 and 17, as the shield hub 72 rotates about the rotational axis 76, the shield arm follower 142 of the shield arm 136 may engage the cam 190, thereby forcing the shield arm 136, and hence the respective shield 84, axially forward against the biasing force of the spring 178, as shown in FIGS. 18B and 18C. As the shield hub 72 continues to rotate in the first rotational direction 194, the shield arm follower 142 disengages from the cam 190 causing the spring 178 to return the shield arm 136 to the default position of the shield arm 136 in the second axial direction 198, as shown in FIG. 18D.

In Step 1910, the probes 54 measure fluid flow parameters within the fluid flow path 74. Because the shields 84 are circumferentially offset from the probes 54, the probes 54 remain unobstructed by the shields 84 during the measurement of fluid flow parameters.

In Step 1912, the shield hub 72 may be returned to a position in which each of the shields 84 is again circumferentially aligned with a respective one of the probes 54 so that the shields 84 are positioned to protect each of the probes 54 (see FIG. 4), for example, in preparation for further icing tests. The shield hub 72 may be rotated relative to the instrumentation hub 70 in a second rotational direction, opposite the first rotational direction 194. In Step 1914, each shield 84 is axially translated away from each respective probe 54, similar to the axial translation discussed above with respect to Step 1908, in response to engagement between the shield biasing assembly 134 and respective cam 190.

It is noted that various connections are set forth between elements in the preceding description and in the drawings. It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities. It is further noted that various method or process steps for embodiments of the present disclosure are described in the following description and drawings. The description may present the method and/or process steps as a particular sequence. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the description should not be construed as a limitation.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various aspects of the present disclosure have been disclosed, it will be apparent to those of ordinary skill in the art that many more embodiments and implementations are possible within the scope of the present disclosure. For example, the present disclosure as described herein includes several aspects and embodiments that include particular features. Although these particular features may be described individually, it is within the scope of the present disclosure that some or all of these features may be combined with any one of the aspects and remain within the scope of the present disclosure. References to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Accordingly, the present disclosure is not to be restricted except in light of the attached claims and their equivalents.

The invention claimed is:

1. A measurement system for an aircraft gas turbine engine, the measurement system comprising:

an instrumentation hub disposed about a rotational axis, the instrumentation hub including at least one probe; and a shield hub disposed about the rotational axis and positioned axially adjacent the instrumentation hub, the shield hub including at least one shield configured to be radially aligned with the at least one probe of the instrumentation hub, the shield hub rotatable about the rotational axis independent of the instrumentation hub, the at least one shield axially translatable between a first axial position and a second axial position, the at least one shield in the first axial position axially aligned with the at least one probe and the at least one shield in the second axial position axially separated from the at least one probe.

2. The measurement system of claim 1, wherein the at least one probe includes a probe body and at least one sensor inlet port extending through the probe body, the at least one sensor inlet port configured to receive and convey a fluid for measurement.

3. The measurement system of claim 1, wherein the shield hub is configured to rotate relative to the instrumentation hub about the rotational axis and wherein:

in a first rotational position of the shield hub, the at least one shield is circumferentially aligned with the at least one probe; and in a second rotational position of the shield hub, the at least one shield is circumferentially offset from the at least one probe.

4. The measurement system of claim 1, wherein the at least one shield has an arcuate cross-sectional shape.

5. The measurement system of claim 1, further comprising a motor connected to the shield hub by a shaft, the motor configured to rotate the shield hub about the rotational axis.

6. The measurement system of claim 1, wherein the shield hub is configured such that rotation of the shield hub about the rotational axis effects axial translation of the at least one shield from the first axial position to the second axial position.

7. The measurement system of claim 6, further comprising a fixed cam hub disposed about the rotational axis and positioned axially adjacent the shield hub, the fixed cam hub including at least one cam positioned at an outer radial side of the fixed cam hub.

8. The measurement system of claim 7, wherein the shield hub includes at least one shield biasing assembly configured to engage the at least one cam.

9. The measurement system of claim 8, wherein the at least one shield biasing assembly includes a shield arm mounted to the shield hub and the at least one shield, the at least one shield arm axially translatable relative to the at least one probe between the first axial position and the second axial position.

10. The measurement system of claim 9, wherein the shield arm includes a shield arm follower including at least one ramped circumferential end.

11. The measurement system of claim 9, wherein the at least one shield biasing assembly includes:

a slider rod extending through the shield arm, the shield arm axially translatable along the slider rod; and a biasing spring disposed about the slider rod, the biasing spring positioned between the shield hub and the shield arm.

12. The measurement system of claim 9, wherein the at least one shield biasing assembly includes a first roller and a second roller, the first roller and the second roller rotatably mounted to the shield hub, the shield arm configured to translate between the first axial position and the second axial position between and in contact with the first roller and the second roller.

13. The measurement system of claim 7, wherein the at least one cam is circumferentially offset from the at least one probe with respect to the rotational axis.

14. A gas turbine engine for an aircraft, the gas turbine engine comprising:

an annular fluid flow path disposed about a longitudinal centerline of the gas turbine engine; and a measurement system comprising:

an instrumentation hub disposed about the longitudinal centerline, the instrumentation hub including at least one probe positioned within the annular fluid flow path; and a shield hub disposed about the longitudinal centerline and positioned axially adjacent the instrumentation hub, the shield hub including at least one shield configured to be radially aligned with the at least one probe of the instrumentation hub, the shield hub rotatable about the longitudinal centerline independent of the instrumentation hub, the at least one shield axially translatable between a first axial position and a second axial position, the at least one shield in the first axial position axially aligned with the at least one probe and the at least one shield in the second axial position axially separated from the at least one probe.

15. The gas turbine engine of claim 14, further comprising a compressor, the compressor including the annular fluid flow path, at least a portion of the measurement system positioned within the compressor.

16. The gas turbine engine of claim 14, further comprising a plurality of variable vanes positioned upstream of the shield hub within the annular fluid flow path.

17. The gas turbine engine of claim 14, wherein the shield hub is configured to rotate relative to the instrumentation hub about the longitudinal centerline and wherein:

in a first rotational position of the shield hub, the at least one shield is circumferentially aligned with the at least one probe; and in a second rotational position of the shield hub, the at least one shield is circumferentially offset from the at least one probe.

18. A method for operating a measurement system for an aircraft gas turbine engine, the method comprising:

rotating a shield hub including at least one shield relative to an instrumentation hub including at least one probe in a first rotational direction to circumferentially offset the at least one shield from the at least one probe; and axially translating the at least one shield relative to the at least one probe to axially offset the at least one shield from the at least one probe, as the shield is rotated in the first rotational direction.

19. The method of claim 18, further comprising performing an icing test with the at least one shield circumferentially aligned with the at least one probe, prior to the steps of rotating the shield hub and axially translating the at least one shield.

20. The method of claim 18, further comprising measuring a fluid flow parameter of a fluid with the at least one probe, subsequent to the steps of rotating the shield hub and axially translating the at least one shield.

* * * * *